H. A. BEYNON.
AUTO SEAT VENTILATOR BACK.
APPLICATION FILED OCT. 15, 1920.
1,412,037. Patented Apr. 11, 1922.
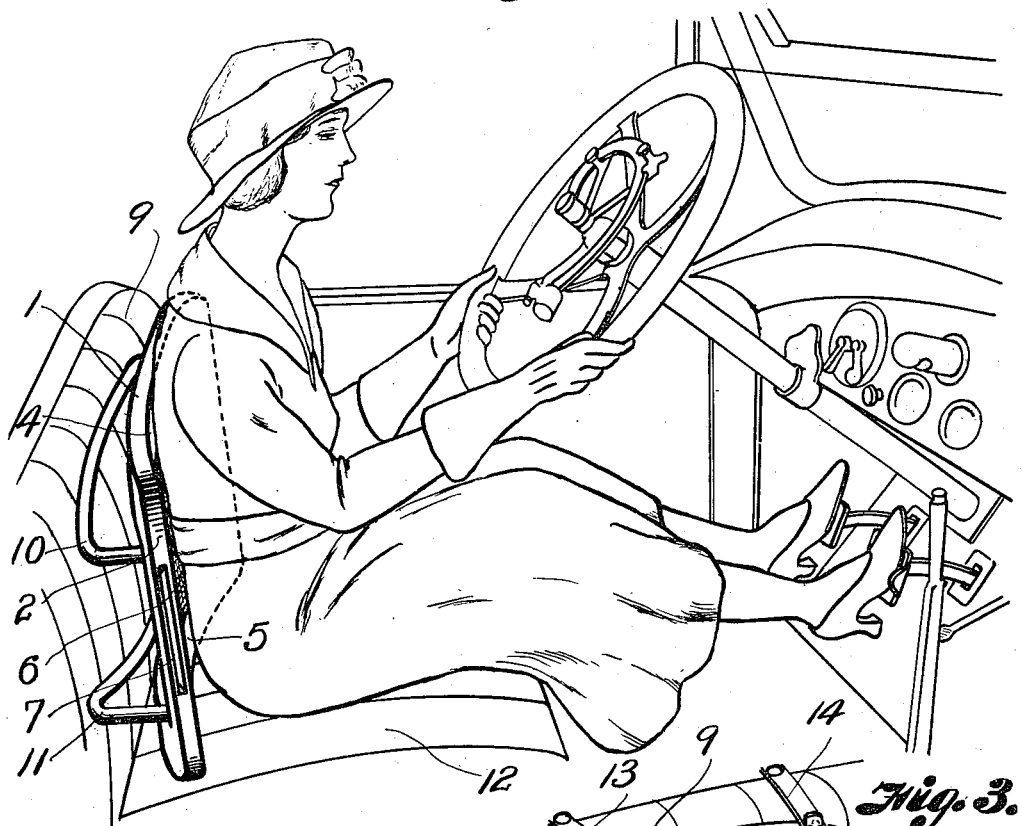
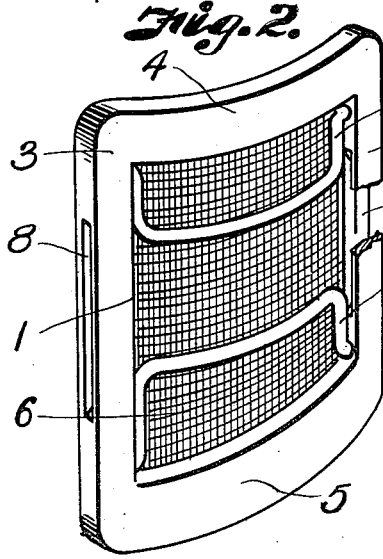
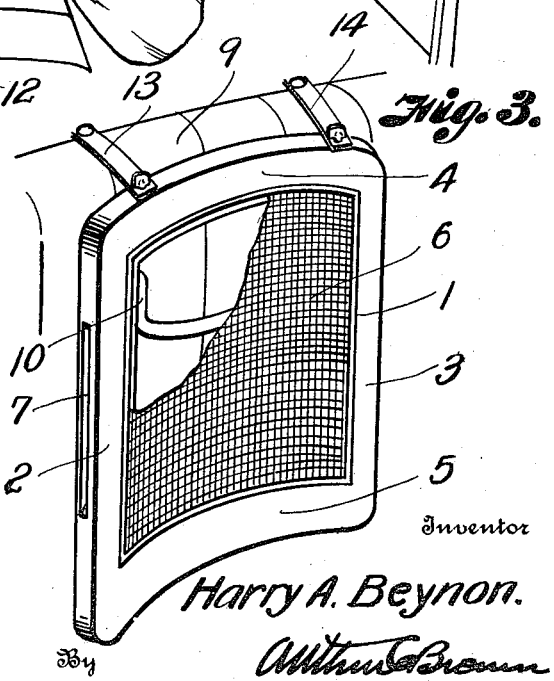
Inventor
Harry A. Beynon.
Attorney

UNITED STATES PATENT OFFICE.

HARRY A. BEYNON, OF KANSAS CITY, MISSOURI.

AUTO-SEAT VENTILATOR BACK.

1,412,037. Specification of Letters Patent. Patented Apr. 11, 1922.

Application filed October 15, 1920. Serial No. 417,269.

*To all whom it may concern:*

Be it known that I, HARRY A. BEYNON, a citizen of the United States, residing at Kansas City, in the county of Jackson and State of Missouri, have invented certain new and useful Improvements in Auto-Seat Ventilator Backs; and I do declare the following to be a full, clear, and exact description of the invention such as will enable other skilled in the art to which it appertains to make and use the same, reference being had to the accompanying drawings, and to the letters and figures of reference marked thereon, which form a part of this specification.

This invention relates to an automobile seat ventilator back, the primary object being to provide a supplemental seat back adapted to be interposed between the back of the driver and the back of the seat so as to throw the body of the driver forward to permit easy access to the pedals.

It is well known that drivers short of stature have difficulty in reaching the pedals of a motor vehicle unless some means for throwing the body forward is interposed between them and the back of the seat. Cushions and similar seat augmenting devices have been used but cushions are liable to render the back hot and uncomfortable and do not always efficiently serve the purpose intended.

I have provided means whereby an adjustable device may be interposed between the back of the driver and the back of the seat to not only throw the body forward but also serve the purpose of ventilating the back of the driver so as to prevent the uncomfortable position usually found in driving vehicles during hot weather.

The invention contemplates a panel having means for permitting a flow of air between the driver's back and the back of the seat and it also contemplates the provision of means for offsetting the panel from the seat back so as to shorten the distance between the back support of the driver and the pedals.

The device is capable, however, of being adjusted for persons of different heights and that is accomplished by a spacing means which may or may not be employed, as the occasion may demand.

In the drawings,

Fig. 1 is a perspective view of a portion of a motor vehicle to which my invention is applied.

Fig. 2 is a rear perspective view of the completed device, and

Fig. 3 is a front view, showing the device modified to the extent that means is shown for fastening it to the seat back.

Referring now to the drawings by numerals of reference:

1 designates a panel frame having side bars 2 and 3 and top and bottom bars 4 and 5 respectively. The frame is provided with a panel 6 of reticulated material having perforations to permit air to pass through it. The panel may consist of cane, wire, metal, wood or any suitable material and it is preferably carried by the front portion of the frame, there being vertical, longitudinal air openings or slots 7 and 8 in the side bars 2 and 3 to permit air to pass into the space between the back of the frame 1 and the seat 9, against which it rests.

The frame is provided with spacers shown as consisting of bail-shaped members 10 and 11 which are pivotally secured to the side bars and adapted to fold into the frame as shown in Fig. 2, or be extended at right angles, as shown in Fig. 1. In the former case, the frame may rest directly against the back 9 and be supported upon the seat 12, but in the latter case, the bail-shaped members 10 and 11 may serve as spacers to provide for persons of short stature, as will be clearly apparent by reference to Fig. 1.

If desired, the device can be secured to the seat 9 by fastening devices 13 and 14, which may be of any preferred construction.

From the foregoing it will be apparent that a device constructed in accordance with my invention will be easily applied to the ordinary seat of a motor vehicle or the like and that it has two positions, the position shown in Fig. 2 for relatively tall persons and the position shown in Fig. 1 for relatively short persons. Therefore, the device is adjustable by moving out the bail-shaped members 10 and 11 or collapsing them, as shown in Fig. 2.

It will also be apparent that the back will be efficiently ventilated in either position so that liability of the back of the driver becoming hot and uncomfortable will be eliminated.

What I claim and desire to secure by Letters-Patent is:

An auto seat ventilator back comprising a frame separate from the auto seat and adapted to rest edgewise thereon, the frame having a rear recess, and bail-shaped members hinged to the top and bottom of the frame and adapted to swing outwardly to engage the seat back to space the ventilator back therefrom and to space the top and bottom edges of the ventilator back therefrom, the bails being adapted to independently nest within the rear recess whereby the seat back can be tilted so that the top portion rests against the auto seat back with the bottom spaced from the auto seat back or vice versa and whereby both bails may be nested within the recess in the ventilator seat back to permit the ventilator seat back to rest flush against the auto seat back.

In testimony whereof I affix my signature.

HARRY A. BEYNON